(12) United States Patent
Meier et al.

(10) Patent No.: US 7,424,007 B2
(45) Date of Patent: Sep. 9, 2008

(54) POWER-SAVE METHOD FOR 802.11 MULTICAST PAGING APPLICATIONS

(75) Inventors: Robert C. Meier, Cuyahoga Falls, OH (US); Victor Griswold, North Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 10/844,303

(22) Filed: May 12, 2004

(65) Prior Publication Data

US 2005/0254444 A1    Nov. 17, 2005

(51) Int. Cl.
*H04L 12/66* (2006.01)
*H04B 1/38* (2006.01)

(52) U.S. Cl. .............. 370/352; 370/311; 370/338; 370/449; 370/459; 370/473; 455/343; 455/465; 455/503; 455/525; 455/574; 709/238; 709/242

(58) Field of Classification Search .......... 370/318, 370/338, 432, 311, 328, 352, 449, 459, 473; 455/574, 502, 503, 343, 465, 525; 709/238, 709/242

See application file for complete search history.

(56) References Cited

U.S. PATENT DOCUMENTS

| 5,740,366 | A | 4/1998 | Mahany et al. |
|---|---|---|---|
| 6,374,311 | B1 | 4/2002 | Mahany et al. |
| 6,564,074 | B2 * | 5/2003 | Romans ............... 455/574 |
| 6,665,520 | B2 * | 12/2003 | Romans ............... 455/13.4 |
| 6,674,738 | B1 * | 1/2004 | Yildiz et al. ............ 370/338 |
| 6,791,962 | B2 * | 9/2004 | Wentink ............... 370/338 |
| 6,862,456 | B2 * | 3/2005 | Sugar et al. ............ 455/503 |
| 6,934,299 | B2 * | 8/2005 | Kaatz ............... 370/459 |
| 6,934,752 | B1 * | 8/2005 | Gubbi ............... 709/225 |
| 7,085,808 | B2 * | 8/2006 | Haverinen et al. ...... 709/203 |
| 7,113,498 | B2 * | 9/2006 | Bajic ............... 370/338 |
| 7,301,946 | B2 * | 11/2007 | Meier et al. ............ 370/390 |
| 2002/0132603 | A1 * | 9/2002 | Lindskog et al. ...... 455/343 |
| 2004/0133896 | A1 * | 7/2004 | Lym et al. ............ 719/315 |

(Continued)

OTHER PUBLICATIONS

European Patent Office, Supplementary European Search Report, Feb. 20, 2008.

(Continued)

*Primary Examiner*—Edan Orgad
*Assistant Examiner*—Venkatesh Haliyur
(74) *Attorney, Agent, or Firm*—Tucker Ellis & West LLP

(57) ABSTRACT

A power-save method for a network with an access point and an associated power-save client. The access point buffers wireless data that includes a unicast frame and a multicast frame. A periodic scheduled beacon message is transmitted with a unicast indication element and a multicast indication element. The unicast element instructs a client to remain awake to receive a buffered unicast frame, which includes a destination MAC address. The multicast element instructs a client to remain awake following the beacon to receive a buffered multicast frame, which includes a destination multicast address designating a multicast group of which the client is a member. At least one beacon message is designated as a multicast delivery beacon. The buffered multicast frame is transmitted following the designated multicast beacon. The multicast element contains a list of entries, each entry corresponding to either a multicast MAC address, multicast IP address, or client identifier.

26 Claims, 3 Drawing Sheets

U.S. PATENT DOCUMENTS

2004/0259542 A1* 12/2004 Viitamaki et al. ........ 455/426.2
2005/0018624 A1   1/2005 Meier et al.
2005/0076145 A1*  4/2005 Ben-Zvi et al. ............ 709/245
2005/0122927 A1*  6/2005 Wentink ..................... 370/311
2005/0170868 A1*  8/2005 Fischer ...................... 455/574

OTHER PUBLICATIONS

ISO/IEC 8802-11 ANSI/IEEE STD 802.11, "Part 11: Wireless LAN Medium Access Control (MAC) and Physical Layer (PHY) Specifications," Aug. 20, 1999, pp. 123-137, XP002207975.

* cited by examiner

US 7,424,007 B2

POWER-SAVE METHOD FOR 802.11 MULTICAST PAGING APPLICATIONS

RELATED APPLICATION

The present system is related to U.S. patent application Ser. No. 10/723,328 by Griswold, et al. entitled "OPTIMIZING 802.11 POWER-SAVE FOR IP MULTICAST GROUPS" filed on Nov. 26, 2003, the entirety of which is hereby incorporated by reference.

BACKGROUND

The present invention relates generally to wireless broadcast transmissions and more particularly to a method for power consumption by an IEEE 802.11 client station containing both a Voice-over-Internet Protocol and an Internet Protocol paging application.

An IEEE 802.11 client station having both Voice-over-Internet Protocol (VoIP) and Internet Protocol paging applications must receive unicast VoIP messages, broadcast Address Resolution Protocol, or ARP, messages, and IP Multicast "paging" messages. In a typical computer network, unicast VoIP operation is a communications transmission between a single sender and a single receiver over a network.

In contrast to the unicast transmission of VoIP, paging is typically a multicast operation. Multicast is a technique that allows data, including data encapsulated in packet form, to be simultaneously transmitted to a selected set of destinations. Some networks, such as Ethernet, support multicast by allowing a network interface to belong to one or more multicast groups. In some applications of multicast, identical data is simultaneously transmitted to a selected set of destinations in a network, without obtaining acknowledgement that the transmission was received by the recipient devices. Multicast transmissions are also capable of being sent to a multicast address, which is typically a routing address that is used to address, i.e., designate, simultaneously all the computers in a group and usually identifies a group of computers that share a common protocol, as opposed to a group of computers that share a common network.

Thus, while multicast has a single sender and multiple recipients, unicast has but a single sender and a single recipient. Similar to multicast, broadcast operation is the transmission of signals that may be simultaneously received by stations that typically make no acknowledgement of the receipt of the transmission.

Address Resolution Protocol is a communications protocol used to map a selected Internet Protocol (IP) address to a preset Media Access Control (MAC) address. ARP matches higher-level IP addresses to the physical addresses of the destination host. It uses a lookup table (called an ARP cache) to perform the translation. When the address is not found in the ARP cache, a broadcast is sent out on the network with a special format called the ARP request. If one of the machines on the network recognizes its own IP address in the request, it sends an ARP reply back to the requesting host. The reply contains the physical hardware (MAC) address of the receiving host. The requesting host stores this address in its ARP cache so that all subsequent datagrams to this destination IP address can be translated to a physical address.

A Traffic Indication Message (TIM) may be found in an 802.11 Beacon Frame which is transmitted from an 802.11 access point (AP). In essence, a TIM is used by access points to tell power-save client devices that one or more unicast packets are waiting for them. A TIM consists of an array of bit flags, with one bit flag for each client associated with the AP. An AP sets a station's TIM bit to "1" if it has one or more frames buffered for the client. An AP sends Beacons at fixed intervals. If an 802.11 power-save station only needs to receive unicast frames, it can wake up to receive a Beacon, check its TIM bit, and immediately return to a "sleep" mode if the TIM bit is set to "0".

A Delivery Traffic Indication Message (DTIM) is contained in DTIM Beacons sent by access points. If a power-save station associated with an AP, then the AP buffers broadcast and multicast frames and sends the buffered frames to associated stations immediately following a DTIM Beacon. If a power-save station must receive broadcast or multicast frames, then it must wake up for each DTIM Beacon transmission and it must stay awake until the last broadcast/multicast frame is transmitted, following the DTIM Beacon.

Proxy ARP refers to a method wherein an AP sends an ARP Reply, on behalf of an associated station, when the AP receives and ARP Request directed to the associated station. Proxy ARP enables a power-save station to sleep during the broadcast/multicast period, following a DTIM Beacon, if it does not need to receive any of other multicast or broadcast frames.

Previous attempts to implement proxy ARP 802.11 VoIP phone applications have been met with limited success. Such uses of the proxy ARP has enabled the VoIP phone to sleep, or operate in power-save protocol mode, during lengthy broadcast/multicast transmissions. However, this mechanism, by itself, is not usable for an 802.11 VoIP/Paging device insofar as the paging application requires the phone to remain active following the DTIM to receive other multicast transmissions.

A problem associated with an 802.11 client device supporting both VoIP and paging applications is that the radio power consumption in an 802.11 VoIP phone is much higher than the radio power consumption in a cellular telephone. The greater drain on energy has limited the application of both VoIP and paging into a single device. Power-save stations must stay awake, for the duration of the multicast delivery period, to receive multicast transmissions. As a result, broadcast/multicast transmissions can reduce battery life in power-save stations.

Thus, there exists a need for a system and method to provide an effective power-save solution for combined VoIP/paging applications.

SUMMARY OF INVENTION

The present innovation addresses the above-noted deficiencies and others, and teaches a system and method for facilitating power-savings in an IEEE 802.11 VoIP/Paging device.

In accordance with the present invention, there is taught a power-save system for wireless data transmission. The access point stores a list of IP multicast addresses for each associated station, wherein each address in the list corresponds to an IP multicast group. The access point also maintains a set of IP multicast groups, wherein each multicast group in the set is identified by an IP multicast address. At least one station associated with the access point is a member of each of the multicast groups in the access point's set of multicast groups. Each multicast group is classified as either "active" or "power-save". An access point classifies a multicast group as "active" if all stations in the multicast group are operating in active mode; otherwise, the AP classifies a multicast group as "power-save" if at least one station in the multicast group is operating in power-save mode. On 802.11 links, an access point transmits multicast packets, which are destined to an active multicast group, immediately; an access point buffers multicast packets, which are destined to a power-save multicast group, until the next delivery traffic indication message (DTIM) Beacon; and an AP does not transmit multicast packets, which are not destined to an active or power-save multicast group.

The access point includes a multicast traffic indication message (MTIM) element in each transmitted DTIM Beacon. The MTIM element comprises a list of zero or more entries. The MTIM element identifies power-save IP multicast groups, for which downlink multicast frames are buffered in the access point. When a power-save station is a member of an IP multicast group identified by an entry in the MTIM element, the station must remain active to receive all power-save multicast transmissions sent following the DTIM Beacon.

In one aspect of the present system, the MTIM element is comprised of a list of zero or more IP multicast addresses. In another aspect of the present system, the MTIM element is comprised of a list of zero or more multicast MAC addresses, where each MAC address corresponds to an IP multicast address. The multicast MAC address is suitably generated by concatenating a 3-byte hex 01005E prefix with the low-order 3-bytes of the multicast IP address. In yet another aspect of the present system, the MTIM element is comprised of a list stations that must stay awake, following a DTIM Beacon transmission, to receive multicast transmissions. The list of stations in the MTIM element can be structured as an array of bit flags, where each MTIM bit flag corresponds to the association identifier of a station and the AP sets the MTIM bit flag for a station to '1' if the station is participating in a multicast group where multicast frames are buffered for transmission following a DTIM Beacon.

Still another aspect of the present system is the MTIM element notifies the station in an IP multicast group to stay active following the transmission of the delivery traffic indication message to receive downlink multicast frames buffered for the IP multicast group. Still yet another aspect of the present system is the MTIM element notifies the associated station that the access point supports the MTIM method and enables the associated station to selectively ignore useless multicast transmissions.

A further aspect of the present system is the combination of the multicast traffic indication message element with an existing Proxy ARP mechanism, to provide an effective power-save solution for combined VoIP/Paging applications. Further in accordance with the present invention, there is taught a power-save system for wireless data streaming. The system includes an access point that provides a wireless data link to at least one associated client. The access point is placed in wired data communication with a data network. The access point includes memory that stores an IP address and MAC address for each associated client station. The access point further includes memory that stores a list of enabled IP multicast addresses and a MAC address for each associated client station. The system also includes registration means adapted for registering each associated client with the access point. The system includes means adapted for registering IP group membership information of each associated client with the network infrastructure. The system incorporates a receiver associated with the access point, the receiver including means adapted for receiving a data stream from the selected data network. The system further includes means adapted for selectively notifying each associated client station of the data stream according to the relationship data. The access point then forwards the data stream from the access point to each notified associated client. The system also includes link maintenance means adapted for communicating link data between the access point and the associated client. The link data represents an ongoing, active wireless data streaming link between the access point and the associated client.

One aspect of the present system is that the data stream includes VoIP and paging data. Another aspect of the present system provides that the link maintenance means further includes a system adapted for communicating pending multicast transmissions to client stations. In yet another aspect of the present system, the access point includes means adapted for determining membership of each associated station in a streaming multicast data group.

Further in accordance with the present invention, there is taught a power-save method on a selected network comprising an access point adapted to provide wireless data link to at least one associated client, the access point adapted to be placed in wired data communication with the selected network. The access point stores, in an associated memory, an IP address and a MAC address corresponding to each associated client. The access point stores, in an associated memory, a list of multicast addresses and a MAC address corresponding to each associated client. Each client is registered with the access point. Relationship data associating a MAC address, an IP address, and a list of multicast addresses, for each registered client is stored in the memory. The access point receives a data stream from the selected data network. The access point then selectively notifies each associated client of the data stream according to the relationship data. The access point signals a client when it has one or more pending multicast transmissions, wherein the destination multicast address is in the client's list of multicast addresses. The client then stays awake to receive the multicast transmissions.

One aspect of the subject invention is that a data stream includes VoIP and paging data. Yet another aspect of the present system is a teaching, wherein an access point determines membership of each associated station in a streaming multicast data group.

Yet further in accordance with the present invention, there is taught a computer-readable medium for wireless data streaming. The computer readable medium includes an access point adapted to provide a wireless data link to at least one associated client, wherein the access point is placed in wired data communication with a selected data network. The computer-readable medium also includes means adapted for storing at least one of IP address data and MAC address data for each associated client in a memory associated with the access point. The computer-readable medium also includes means adapted for storing a list of multicast address and a MAC address for each associated power-save client in a memory associated with the access point. The computer-readable medium further includes registration means adapted for registering one associated client with the access point. The access point includes means adapted for storing, in the memory, relationship data associating a MAC address and IP address for each registered client. The access point includes means adapted for storing, in the memory, relationship data associating a MAC address and a list of IP multicast addresses for each registered client. The computer readable medium teaches means adapted for receiving, on a receiver associated with the access point, a data stream from the selected data network. The computer readable medium also teaches means adapted for selectively notifying each associated client station of the data stream according to the relationship data. The computer readable medium further includes link maintenance means adapted for communicating link data between the access point and the associated client, wherein the link data represents an ongoing, active wireless data streaming link between the access point and the associated client.

One advantage of the subject invention is that a data stream includes VoIP and paging data. Another advantage of the present computer readable medium is in the teaching of a system for communicating link open information to the associated client. Yet another advantage of the present system is a teaching, wherein an access point determines membership of each associated station in a streaming multicast data group.

Still yet further in accordance with the present invention, there is taught a computer implemented power-save method for wireless data streaming. An access point stores, in an associated memory, an IP address and a MAC address corresponding to each associated client. An access point also stores, in an associated memory, a list of IP addresses and a MAC address corresponding to associated clients. Each client is registered with the access point. Relationship data associating a MAC address and an IP address for each registered client is stored in the memory. Relationship data associating a list of multicast addresses and a MAC address for registered clients is also stored in the memory. The access point receives a data stream from the selected data network. The access point then selectively notifies each associated station of the data stream according to the relationship data.

One advantage of the subject invention is that a data stream includes VoIP and paging data. Yet another advantage of the present system is a teaching, wherein an access point determines membership of each associated station in a streaming data group. Still yet another advantage of the present system is the teaching of classification of the streaming data group into either a power-save or active group.

Further in accordance with the present invention, there is taught a power-save method for a network with an access point and an associated power-save client. The access point buffers wireless data that includes a unicast frame and a multicast frame. A periodic scheduled beacon message is transmitted with a unicast indication element and a multicast indication element. The unicast element instructs a client to remain awake to receive a buffered unicast frame, which includes a destination MAC address. The multicast element instructs a client to remain awake following the beacon to receive a buffered multicast frame, which includes a destination multicast address designating a multicast group of which the client is a member. At least one beacon message is designated as a multicast delivery beacon. The buffered multicast frame is transmitted following the designated multicast beacon. The multicast element contains a list of entries, each entry corresponding to either a multicast MAC address, multicast IP address, or client identifier.

Still other advantages of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE EMBODIMENTS

The following includes examples of various embodiments and/or forms of components that fall within the scope of the present system that are advantageously used for implementation. Of course, the examples are not intended to be limiting and other embodiments may be implemented without departing from the spirit and scope of the invention. Specifically, a power-save station is suitably configured to eliminate the need to stay awake to receive all power-save multicast/broadcast frames sent by its parent AP following a DTIM beacon.

As described herein, the present system and method has two primary components:

I. Proxy Address Resolution Protocol (Proxy ARP), and

II. Multicast Traffic Indication Message (MTIM).

Each of the components are discussed separately and in detail below. It will be appreciated that the mechanisms described herein capable of implementation individually or combined. As well, an artisan will appreciate that the system and method described herein is not limited to IEEE 802.11 Voice-over Internet Protocol (VoIP) and multicast Paging applications. However, for convenience and demonstrative purposes, the described embodiments are directed to a VoIP/Paging 802.11 application.

Figure 1:
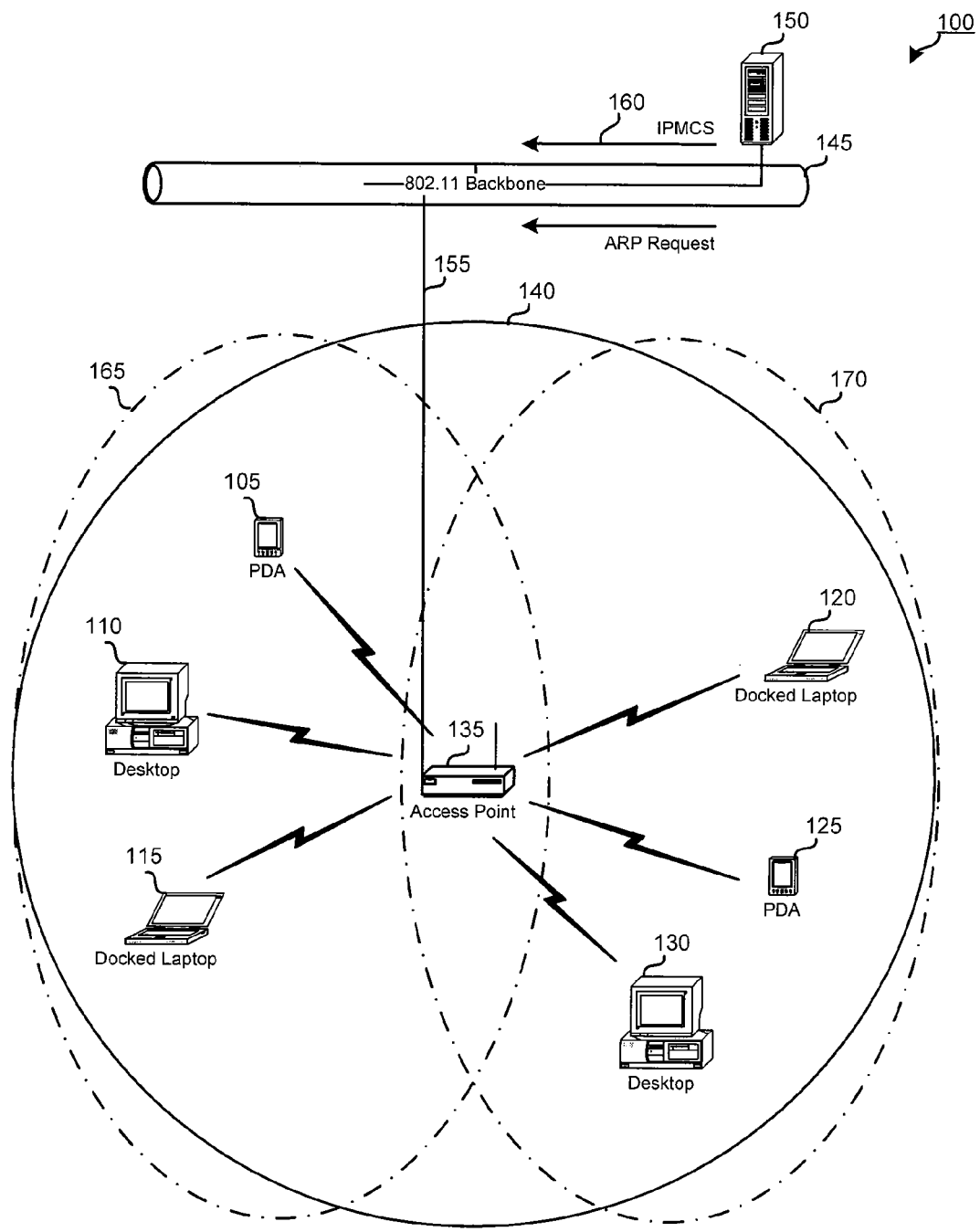
FIG. 1 is a diagram illustrative of an IEEE 802.11 network.

By way of background, FIG. 1 illustrates a simplified system diagram of a typical network 100 in accordance with the present system and method. The network 100 includes wireless stations 105-130 suitably configured and connected to access services and receive multicast transmission on the network 100 via an access point 135. It will be appreciated that the wireless stations 105-130 are capable of transmitting and/or receiving data packets via a wireless network such as any one of numerous wireless devices, including, but not limited to, a laptop/notebook portable computer having a Cardbus network adapter suitable for wireless communication with a wired network, an electronic tablet having a suitable wireless network adapter, a handheld device or personal digital assistant containing a suitable wireless network adapter for communicating to a wired network or the like.

The Basic Service Set (BSS) 140 of the access point 135 is shown. Wireless stations 105-130 are suitably configured to communicate with the access point 135 so long as they remain in the BSS 140. In other words, as members of the BSS 140, wireless stations 105-130 are physically located within the access point 135 wireless communication coverage area.

A backbone 145 is used to connect the access point 135 and a network server 150 via a physical wired connection 155. Typically, the backbone is a wired network connection such as Ethernet. An artisan will appreciate that any suitable means, wired or wireless, as well as any networking protocol known in the art, are suitably employed without departing from the spirit and scope of the present system and method.

During normal operation of the system 100, the network server 150 is used together with the access point 135 to authenticate wireless stations 105-130. While the aforementioned network 100 illustrates a single access point and six wireless stations, one of skill in the art can readily appreciate that a network may comprise any number of access points and any number or type of wireless stations.

It will be appreciated that the relative position of wireless stations 105-130 may change with respect to each other and to the access point 135. However, provided the wireless stations 105-130 remain within the coverage area of the BSS 140, they will remain members of the BSS 140 of the access point 135.

In operation, an IP multicast stream 160 is received by the system 100 from a remote location. It will be appreciated by one of ordinary skill in the art that a location of the sender(s) of the multicast stream 160 is not particularly relevant to the present system. In other words, the present system and method is configured to operate as well with a local sender as with an extremely distant sender.

The wireless stations 105, 110 and 115 are suitably configured into a multicast group 165. As well, wireless stations 120, 125 and 130 are suitably configured into a second multicast group 160. Of course, the generation of multicast groups is accomplished in accordance with the above-referenced related U.S. patent application.

The wireless stations 105, 115, and 125 are configured to subscribe to the multicast stream IP multicast stream 160 and are in active mode. Conversely, wireless stations 110, 120 and 130 shown are in sleep or power-save mode. As illustrated, wireless stations 110, 120 and 130 are not subscribers to the multicast stream IP multicast stream 160.

In accordance with earlier implementations, upon receipt of the IP multicast stream 160 by the access point 135, the access point 135 determines the mode, power-save or active, of all stations contained within the BSS 140. In this example, the access point 135 is suitably configured to determine the mode of all stations in the individual multicast groups 165, 170.

Wireless stations 110, 120 and 130 are in power-save mode while all remaining stations 105, 115 and 125 are operating in active mode. In accordance with earlier systems, because at least one station 110, 120 or 130 is operating in power-save or PSP mode, the access point 135 would automatically batch and queue all incoming multicast packets 160 until the next Delivery Traffic Indication Message (DTIM) beacon is sent to the BSS 140.

However, in accordance with the method and system of the above-mentioned related application, the system is suitably configured to establish multicast groups 165, 170 in order to streamline delivery of multicast messages. In such circumstances, each individual group would adopt the characteristics of the BSS of earlier implementations.

I. Proxy ARP Power-Save Mechanism

Figure 2:
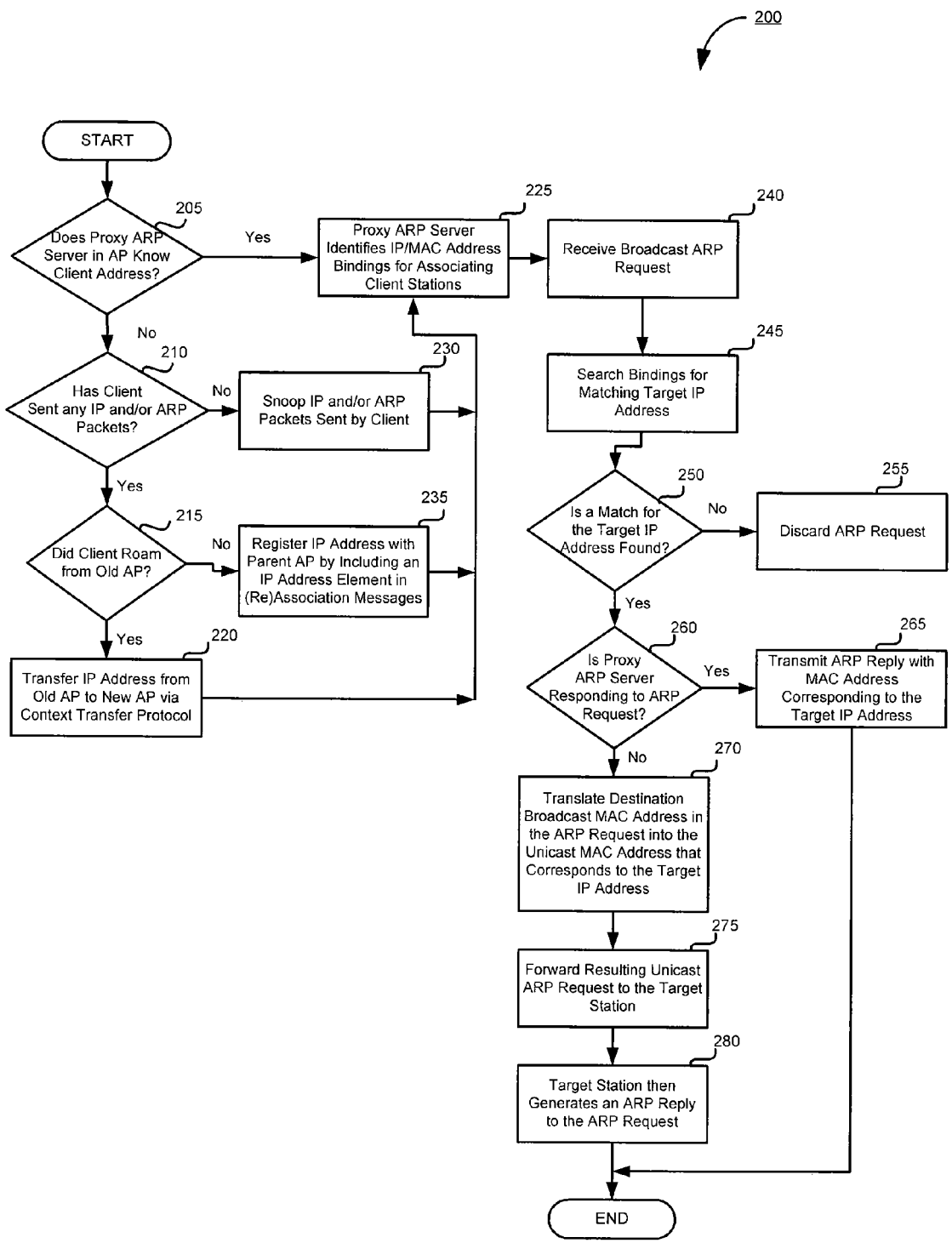
FIG. 2 is a flow chart illustrating the Address Resolution Protocol aspect of the present invention.

Referring now to FIG. 2, there is shown the Address Resolution Protocol component 200 of the present invention, wherein a Proxy ARP server is suitably configured to respond to address resolution requests targeted to an associated client station. As will be understood by those skilled in the art, ARP matches higher-level IP addresses to the physical (i.e, Media Access Control, or MAC) addresses of the destination host. When an IP address is not found in the ARP cache, a broadcast is sent out on the network with a special format called an ARP request. When one of the machines on the network recognizes its own IP address in the request, it sends an ARP reply back to the requesting host. The reply contains the physical hardware address of the receiving host. The requesting host stores this address in its ARP cache so that all subsequent datagrams to this destination IP address can be translated to a physical address. Proxy ARP enables an access point to respond to the ARP request for an associated station in power-save protocol operation.

For explanatory purposes, FIG. 2 shows, via steps 205-235, the method wherein the Proxy ARP server learns the associated client station address. Beginning at step 205, the Proxy ARP server in the access point determines whether it already has the address for the associated or associating client. When the Proxy ARP server determines at step 205 that the client address is known, the Proxy ARP server identifies IP/MAC address bindings for the associated station at step 225. The skilled artisan will appreciate that the storage of the IP/MAC address bindings enables the Proxy ARP server to properly function in accordance with the subject method. It will be appreciated that any one of the 802.11 client stations 105-130 will not need to receive broadcast ARP requests when the Proxy ARP server in the parent access point 135 is already aware of that client's IP address.

In the event that the Proxy ARP server has determined, at step 205, that the Proxy ARP server does not know the client address, the Proxy ARP server then proceeds to step 210, wherein it is determined that the client has not sent any IP packets or previously responded, through the access point, to an ARP request. A negative determination at step 210 prompts the Proxy ARP server, at step 230, to snoop IP and/or ARP packets sent by the client to gain knowledge of the client address. For example, the access point 135 automatically determines the IP address of a client 105, by snooping IP and ARP packets sent by that client 105. After ascertaining the client address, the Proxy ARP server proceeds to store the address in the IP/MAC address bindings for associated stations at step 225.

When the client station has not sent any IP or ARP packets at step 210, the Proxy ARP server progresses to step 215, wherein the Proxy ARP server determines that the client station has roamed from a previous access point to the current access point. Upon such a determination, the Proxy ARP server proceeds to step 220, wherein the IP address associated with the client station is transferred from the old access point to the new access point via a context transfer protocol. The IP address of any or all of the wireless clients 105-120 are transferred from the old access point 135 to the new access point, via the context transfer protocol when the wireless client or clients 105-120 roam from the current BSS 140. Once the IP address has been transferred, the Proxy ARP server proceeds to store the IP/MAC address bindings at step 225.

Returning to step 215, when the Proxy ARP server determines that the client station has not roamed from a previous access point, the Proxy ARP server gathers the client station IP address, at step 235, through the registration process with the parent access point by including an IP address element in an association or re-association message. For example, upon roaming from BSS 140 into a new access point's (not shown) BSS (not shown), wireless clients 105-120 register their corresponding IP addresses with their new parent access point by including an IP address in their association or re-association request messages. Upon receipt of the client station IP address, the Proxy ARP server proceeds to store the IP/MAC address bindings at step 225.

Proceeding with the method illustrated in the flow chart of FIG. 2, the access point receives a broadcast ARP request on its Ethernet port at step 240. The access point then, at step 245, searches its IP/MAC address bindings for an IP address that matches the target IP address embedded within the body of the ARP request. Upon the determination, at step 250, that the access point cannot find a match for the target IP address in the IP/MAC address bindings it stores, the access point then discards the ARP request at step 255.

When the access point determines that a matching IP address is found at step 250, the access point then determines whether a Proxy ARP server is responding to the ARP request for the target IP address at step 260. When a Proxy ARP server is responsible for responding to ARP requests for the target IP address, the Proxy ARP server transmits an ARP reply message with the MAC address corresponding to the target IP address, on its Ethernet link, at step 265.

If, at step 260, the Proxy ARP server determines that it is not responding to the ARP request for an associated client station, the Proxy ARP server translates the destination broadcast MAC address in the ARP Request to the unicast MAC address that corresponds to the target IP address at step 270. The resulting unicast ARP request frame is subsequently forwarded, at step 275, to the target station as any other (e.g. power-save) unicast message. Upon receipt of the unicast ARP request, the target station generates an ARP Reply. For example, upon receiving an ARP request targeted for station 105, the Proxy ARP server (not shown) within the access point 135 is configured to translate the broadcast MAC address contained within the ARP request into a unicast MAC address corresponding to the target IP address in order to transmit the message to station 105.

A power-save 802.11 station is not required to remain in an active state to receive multicast/broadcast transmissions if i) the Proxy ARP server within the access point is generating proxy ARP replies for the client; ii) the client does not have any other pending multicast messages, and iii) the client is aware of the proxy ARP service. In order to facilitate the awareness of the client for the proxy ARP service, the access point is suitably configured to "advertise" that the access point is providing the service via a Proxy ARP flag contained within a proprietary 802.11 information element. The proprietary information element is suitably included in an 802.11 Beacon and/or association or re-association response messages.

An artisan will appreciate that in accordance with 802.11 network protocol, a power-save VoIP station, in standby mode, must wake up periodically to receive beacons, even if it does not need to receive multicast/broadcast frames. In order to notify a station that it has pending multicast/broadcast messages, a Beacon TIM bit, which corresponds to the station's Association ID (AID), is set when the access point has frames buffered for the particular station. Accordingly, a station operating in power-save mode, which does not need to receive multicast/broadcast, may immediately return to sleep after it receives a beacon with its TIM bit set "OFF".

II. Multicast TIM Power-Save Mechanism

As will be appreciated by those skilled in the art, the above Proxy ARP method is useful for a VoIP client station that receives unicast transmissions. A purely VoIP operating station greatly benefits from the lower power-consumption when using the Proxy ARP method described above. However, when the client station is both a VoIP station, as well as a paging station, the above method results in missed multicasts for the paging application. For instance, if a dual-application station does not stay awake to receive power-save broadcast/multicast transmission, it will miss IP multicast frames directed to the Paging Application. This section describes the present system and method whereby an access point uses a Multicast Traffic Indication Message (MTIM) to indicate that it has pending IP multicast frames buffered for stations in respective power-save multicast groups. For example, the access point 135, through the use of a MTIM, alerts stations 105, 110 and 115 in a power-save multicast group 165 of buffered IP multicast frames.

It will be understood by those skilled in the art that an IP multicast group, such as IP groups 165 and 170 of FIG. 1, are identifiable by and associated with a single IP multicast address. Furthermore, a one-to-one correspondence between IP multicast applications and IP multicast addresses exists in most configurations and applications.

Figure 3:
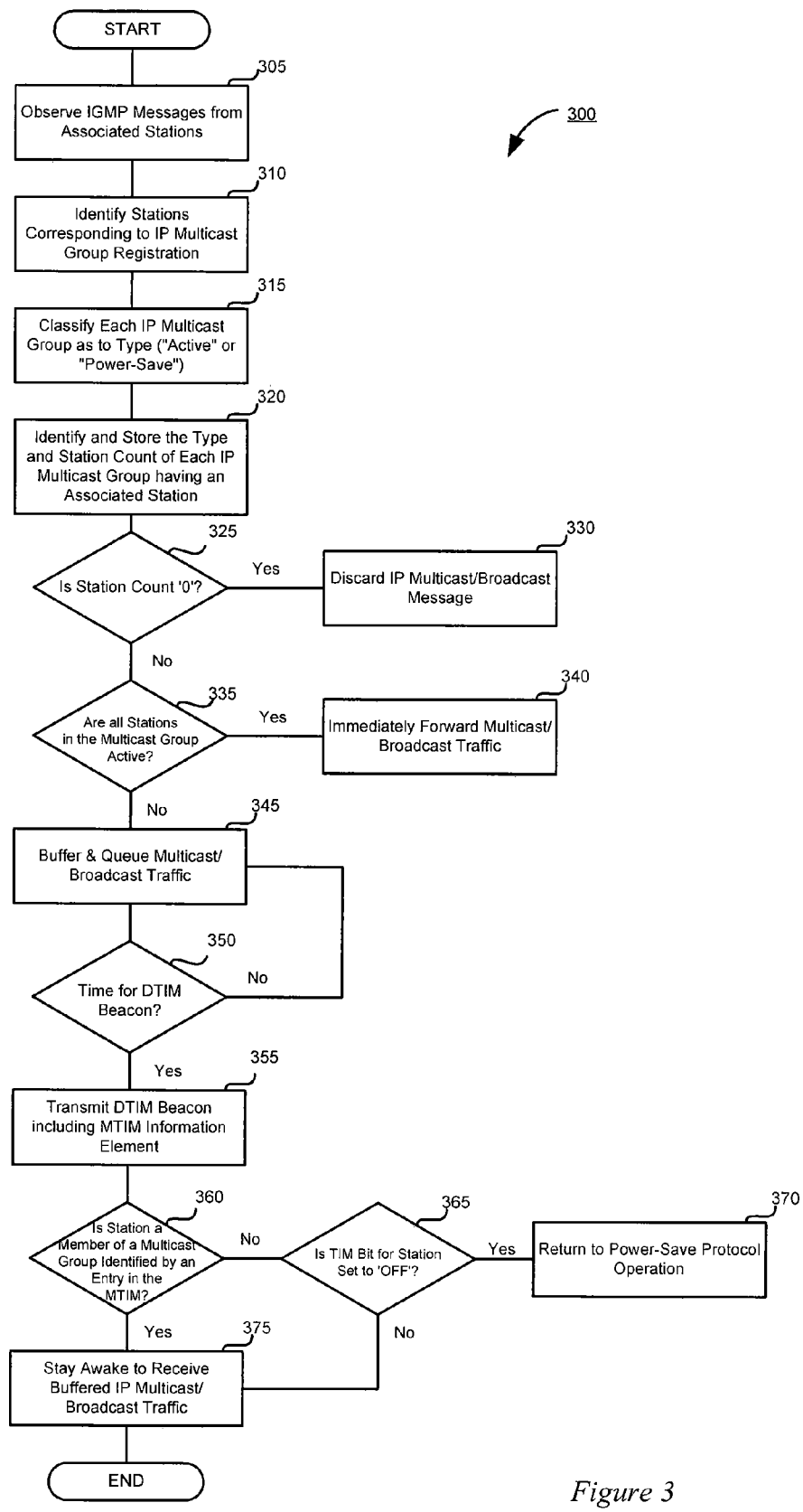
FIG. 3 is a flow chart illustrating the Multicast Traffic Indication Message of the present invention.

Referring now to FIG. 3, there is shown a flow chart of an embodiment of the methodology 300 adapted to incorporate a Multicast Traffic Indication Message into a multicast transmission network in accordance with a disclosed embodiment. Initially, at step 305, the access point observes Internet Group Management Protocol (IGMP) Membership messages from associated stations to determine membership in IP multicast groups. As will be appreciated by those skilled in the art, in the event that a station has roamed from a previous access point to a new access point, the new access point transmits an IGMP general query to solicit membership reports, thereby identifying in which IP multicast groups the roaming station subscribes. Alternatively, group membership information is stored, e.g., cached, in the network infrastructure and transferred to the new parent access point when a station roams using a context transfer protocol.

For example, the parent access point 135 IGMP Membership Report Messages, sent by associated stations 105-120 to determine each station's membership in a specific IP multicast group, i.e, groups 165 and 170. It will be understood by those skilled in the art that the use of two multicast groups is for exemplary purposes only and the subject invention is not limited solely to two groups. Alternatively, the access point 135 is suitably capable of sending an IGMP general query to solicit membership reports when a station (e.g. 105-120) roams from its home BSS 140.

At step 310, the access point identifies stations corresponding to IP multicast group registration. In other words, as described in the above-identified related application, the system identifies specific multicast groups and their corresponding member stations. The access point then classifies each multicast group having an associated station as to the type, such as active or power-save, of the identified multicast groups at step 315. For example, once the IP multicast groups 165, 170 are identified, the access point 135 classifies each IP multicast group 165, 170 as active or power-save. A multicast group is classified as active if all stations in the group are operating in 802.11 active mode. Otherwise, an IP multicast group is classified as power-save; e.g. if at least 1 client or station in the group is operating in 802.11 power-save mode. It will be appreciated that the IEEE 802.11 specification defines the mechanics of an access point to determine the active/power-save mode of associated stations.

Each multicast group having an associated station is then identified by the access point as to type and number of associated stations at step 320. Concurrently, at step 320 the type and station count of each IP multicast group having an associated station is stored by the access point. In reference to FIG. 1, the access point 135 stores the type, active or power-save, and station count for each IP multicast group 165, 170. As well, the access point 135 stores a list of IP multicast addresses for each associated station 105-120.

Next, the access point determines, at step 325 if the corresponding multicast group station count is '0'. If a determination that the station count is '0' is made at step 325, the access point realizes that it has no associated stations in the pre-identified multicast group, for example as a result of disassociation of a station, and discards the subject multicast message, or downlink IP multicast frames, at step 330. It will be appreciated that the station count for each multicast group may be incremented or decremented when any of the stations 105-120, in a multicast group 165 and 170 associates, disassociates, joins a multicast group, leaves a multicast group, or changes its power-save state.

When the access point determines at step 325 that the station count is greater than '0', the access point then determines, at step 330, if the target multicast group has all stations in a constantly active mode. When the access point determines all associated stations in the target IP multicast group are in active mode, the access point immediately forwards the IP multicast/broadcast traffic at step 340 to the target IP multicast group. In operation, the access point 135 immediately sends an 1P multicast packet destined to an active multicast group 165, without waiting for a DTIM beacon. If at step 335, the access point determines that at least one station in the target IP multicast group is operating in power-save, the access point will buffer and queue the multicast/broadcast traffic at step 345. Thus, the access point 135 buffers a multicast packet destined to a power-save multicast group 170, until the next DTIM beacon.

The system proceeds to step 350, where the access point determines if a Delivery Traffic Indication Message is due to be sent. If the time has not yet come for a DTIM Beacon to be sent, the access point returns to buffering and queuing incoming IP multicast packets at step 345. When a DTIM Beacon is due to be transmitted by the access point at step 350, the access point transmits, at step 355, a DTIM Beacon including a MTIM element.

The access point 135 includes a unique MTIM information element in each DTIM Beacon. The MTIM functions to notify stations 120-130, in a power-save IP multicast group 170, to stay awake following a DTIM beacon in order to receive downlink multicast frames buffered for the respective group 170. The MTIM is also functioning to notify stations 105-120 that the access point 135 supports the MTIM method, thus prompting stations 105-120 to selectively skip useless power-save multicast/broadcast transmissions.

The MTIM element consists of a list of zero or more entries. The MTIM entries are capable of two alternative implementations. First, the MTIM lists pending multicast addresses for which downlink multicast frames are buffered in the access point 135. Thus, the stations, upon waking to receive the DTIM/MTIM Beacon, review the list of pending addresses to determine if any of the pending addresses correspond to an IP multicast address. Alternatively, the MTIM lists only those stations for which downlink multicast frames are buffered in the access point 135. Thus, the station, upon receipt of the DTIM/MTIM Beacon, reviews the list of stations to determine if the station has pending multicast messages. In the preferred embodiment, an MTIM is structured exactly as an 802.11 TIM. An MTIM consists of an array of bit flags, where each bit flag corresponds to the Association Identifier (AID) of an associated station. An access point sets an MTIM bit for a station to "1" if the station is a member of a multicast group and the access point has frames buffered for that multicast group.

A VoIP/Paging station, 105-120, configured to support the Proxy ARP and MTIM mechanisms, wakes for each DTIM beacon. Moreover, such a station 105-120 returns to sleep (e.g. power-save) immediately without receiving useless downlink multicast/broadcast frames, if the station's TIM bit is representative of an "OFF" state, and the station is not a member of a multicast group (e.g. 165, 170) identified by an entry in the MTIM.

One skilled in the art will appreciate that if an MTIM is comprised of a list of multicast addresses, then an MTIM entry is configured as an IP multicast address or the corresponding multicast MAC address. It will further be understood by the skilled artisan that a multicast MAC address, for an IP multicast group, is generated by concatenating a 3-byte hex 01005E prefix with the low-order 3 bytes of the multicast IP address. Therefore, a station is capable of deriving the MAC address from the IP address. Because Multicast MAC addresses are explicitly enabled on client LAN interface cards (e.g. Ethernet or 802.11), it will further be appreciated that a management interface exists for a client station to determine multicast group membership.

It will be understood by those skilled in the art that the access point programming and methodology, including logic and data structures, used to support the MTIM mechanism are suitably identical to those needed to support active IP multicast groups, as discussed in the above-identified related United States patent application.

It will be understood by the skilled artisan that there is an infrequent need to transmit "legitimate" broadcast packets for all associated stations to receive. The AID 0 bit in the standard 802.11 TIM does not distinguish between broadcast and multicast, so, with an MTIM present, the AID 0 bit indicates to the MTIM-aware client to monitor the MTIM for further information. In the event that an actual broadcast is intended, the AID 0 bit in the MTIM should be set to indicate the broadcast. Such an indication would result in all MTIM-aware clients remaining awake to receive the necessary broadcast. Setting the AID 0 bit in the MTIM is preferable to just setting the all per-client MTIM bits, since the AID 0 bit is insensitive to any transient IP multicast membership changes made by the client.

Returning to FIG. 3, the system progresses to step 360, where a determination is made that the station is a member of an IP multicast group identified by an entry in the MTIM. Upon this positive determination, the station remains in an active state, at step 375, to receive the buffered IP multicast/broadcast traffic that the access point has queued for transmittal. When it is determined at step 360 that the station is not identified by an entry in the MTIM, the station verifies that the traffic indication message bit corresponding to that station is set to 'OFF' at step 365. When the traffic indication message bit is set to 'OFF', the station returns to power-save protocol operation at step 370. In the event that the traffic indication bit is not set to 'OFF' at step 365, the station remains awake at step 375 to receive the buffered IP multicast traffic. The skilled artisan will appreciate that if, upon receipt of the buffered IP multicast/broadcast traffic, the station realizes it is not an intended recipient, the traffic is discarded and the station will return to power-save protocol operation.

The present methodology is capable of implementation by hardware, software or a combination of both. The subject invention need not and is not intended to be limited to the embodiments described above. While the present method has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the applicant's general inventive concept.

What is claimed is:

1. A power-save method for a network having at least one access point and at least one associated power-save client comprising the steps of:

buffering, at the access point, wireless data including at least one of a unicast frame and a multicast frame;

transmitting a periodic scheduled beacon message over at least one wireless link, the beacon message including a unicast indication element and a multicast indication element;

designating at least one beacon message as a multicast delivery beacon;

transmitting the buffered multicast frame following the designated at least one multicast delivery beacon;

determining multicast group membership for each associated client station;

examining at least one Internet Group Management Protocol Membership Report;

determining, from the at least one Internet Group Management Protocol Membership Report a multicast group membership for the associated client; and classifying each multicast group:

wherein a multicast group is disabled when no associated clients are members, wherein a multicast group is active when all member stations are in active mode, and wherein a multicast group is power-save when at least one associated member station is in power-save mode.

2. The method of claim 1, wherein the unicast indication element includes a unicast indicator, the unicast indicator instructing the client to remain awake to receive at least one unicast frame buffered in the access point; and the multicast indication element includes a multicast indicator, the multicast indicator instructing the client to remain awake, following a beacon transmission, to receive at least one multicast frame.

3. The method of claim 2, wherein the unicast frame includes a destination MAC address identifying the client, and wherein the multicast frame includes a destination multicast address designating a multicast group of which the client is a member.

4. The method of claim 3, wherein the multicast indication element further comprises a list having a plurality of entries.

5. The method of claim 4, wherein each entry in the list corresponds to a multicast MAC address.

6. The method of claim 4, wherein each entry in the list corresponds to a multicast IP address.

7. The method of claim 4, wherein each entry in the list corresponds to a client identifier, wherein the client identifier identifies the client to receive the multicast frame following the transmission beacon.

8. The method of claim 7, wherein the multicast indication element is structured as a standard 802.11 TIM element including an array of bit flags.

9. The method of claim 8, wherein each bit flag of the array of bit flags corresponds to an 802.11 16-bit association identifier.

10. The method of claim 9, further comprising the steps of:

setting one of the bit flags in the array of bit flags to 0, wherein the setting of 0 is indicative to a client having the corresponding 16-bit association identifier to return to a power-save mode; and setting one of the bit flags in the array of bit flags to 1, wherein the setting of 1 is indicative to a client having the corresponding 16-bit association identifier to remain active to receive the multicast transmission.

11. The method in claim 9 further comprising the step of setting a special bit flag in the array of bit flags to 1, wherein the setting of 1 is indicative to all associated clients to remain active to receive a multicast transmission.

12. The method of claim 1, wherein the multicast indication element includes a special entry, the special entry indicating all associated clients are to remain awake following delivery of the beacon message.

13. The method in claim 1, further comprising the step of omitting, from the beacon message, the multicast indication element, wherein the omission indicates to all clients to remain in an active mode.

14. A power-save system for wireless data streaming, comprising:

an access point configured to provide a wireless data link to at least one associated power-save client;

means for buffering, at the access point, wireless data including at least one of a unicast frame and a multicast frame;

means for transmitting a periodic scheduled beacon message over at least one wireless link, the beacon message including a unicast indication element and a multicast indication element;

means for designating at least one beacon message as a multicast delivery beacon;

means for transmitting the buffered multicast frame following the designated at least one multicast delivery beacon;

means for operating a proxy Address Resolution Protocol service, wherein the power-save client does not need to remain awake following the multicast beacon transmission to receive a broadcast Address Resolution Protocol message;

means for determining multicast cigroup membership for each associated client station:

means for classifying each multicast group:

wherein a multicast group is disabled when no associated clients are members, wherein a multicast group is active when all member stations are in active mode, and wherein a multicast group is power-save when at least one associated member station is in power-save mode;

means for deleting multicast frames that are destined to the disabled multicast group;

means for immediately transmittinci multicast frames that are destined to the active multicast group immediately; and means for buffering multicast frames destined to the power-save multicast group for transmission following a beacon transmission.

15. The power-save system of claim 14, wherein the unicast indication element includes a unicast indicator, the unicast indicator instructing the client to remain awake to receive at least one unicast frame buffered in the access point; and the multicast indication element includes a multicast indicator, the multicast indicator instructing the client to remain awake, following a beacon transmission, to receive at least one multicast frame.

16. The power-save system of claim 15, wherein the unicast frame includes a destination MAC address identifying the client, and wherein the multicast frame includes a destination multicast address designating a multicast group of which the client is a member.

17. The power-save system of claim 16, wherein the multicast indication element further comprises a list having a plurality of entries, wherein each entry in the list corresponds to one of the group consisting of a multicast MAC address, a multicast IP address, and a client identifier.

18. The power-save system of claim 17, wherein each bit flag of an array of bit flags in a TIM element corresponds to an 802.11 16-bit association identifier, further comprising:

means for setting one of the bit flags in the array of bit flags to 0, wherein the setting of 0 is indicative to a client having the corresponding 16-bit association identifier to return to a power-save mode;

means for setting one of the bit flags in the array of bit flags to 1, wherein the setting of 1 is indicative to a client having the corresponding 16-bit association identifier to remain active to receive the multicast transmission; and means for setting a special bit flag in the array of bit flags to 1, wherein the setting of 1 is indicative to all associated clients to remain active to receive a multicast transmission.

19. The power-save system of claim 14, further comprising:

means for examining at least one Internet Group Management Protocol Membership Report; and means for determining, from the at least one Internet Group Management Protocol Membership Report a multicast group membership for the associated client.

20. A computer implemented power-save method for a network having at least one access point and at least one associated power-save client comprising the steps of:

buffering, at the access point, wireless data including at least one of a unicast frame and a multicast frame;

transmitting a periodic scheduled beacon message over at least one wireless link, the beacon message including a unicast indication element and a multicast indication element;

designating at least one beacon message as a multicast delivery beacon;

transmitting the buffered multicast frame following the designated at least one multicast delivery beacon;

operating a proxy Address Resolution Protocol service, wherein the power-save client does not need to remain awake following the multicast beacon transmission to receive a broadcast Address Resolution Protocol message;

determining multicast group membership for each associated client station;

classifying each multicast group:

wherein a multicast group is disabled when no associated clients are members, wherein a multicast group is active when all member stations are in active mode, and wherein a multicast group is power-save when at least one associated member station is in power-save mode;

deleting multicast frames that are destined to the disabled multicast group;

immediately transmitting multicast frames that are destined to the active multicast group immediately; and buffering multicast frames destined to the power-save multicast group for transmission following a beacon transmission.

21. The computer implemented power-save method of claim 20, wherein the unicast indication element includes a unicast indicator, the unicast indicator instructing the client to remain awake to receive at least one unicast frame buffered in the access point; and the multicast indication element includes a multicast indicator, the multicast indicator instructing the client to remain awake, following a beacon transmission, to receive at least one multicast frame.

22. The computer implemented power-save method of claim 21, wherein the unicast frame includes a destination MAC address identifying the client, and wherein the multicast frame includes a destination multicast address designating a multicast group of which the client is a member.

23. The computer implemented power-save method of claim 22, wherein the multicast indication element further comprises a list having a plurality of entries, wherein each entry in the list corresponds to one of the group consisting of a multicast MAC address, a multicast IP address, and a client identifier.

24. The computer implemented power-save method of claim 23, wherein each bit flag of an array of bit flags in a TIM element corresponds to an 802.11 16-bit association identifier, further comprising the steps of:

setting one of the bit flags in the array of bit flags to 0, wherein the setting of 0 is indicative to a client having the corresponding 16-bit association identifier to return to a power-save mode;

setting one of the bit flags in the array of bit flags to 1, wherein the setting of 1 is indicative to a client having the corresponding 16-bit association identifier to remain active to receive the multicast transmission; and setting a special bit flag in the array of bit flags to 1, wherein the setting of 1 is indicative to all associated clients to remain active to receive a multicast transmission.

25. The method of claim 1, further comprising the steps of:

deleting multicast frames that are destined to the disabled multicast group;

immediately transmitting multicast frames that are destined to the active multicast group immediately; and buffering multicast frames destined to the power-save multicast group for transmission following a beacon transmission.

26. The method of claim 25, wherein the multicast indication element includes information indicating frames are buffered for the power-save multicast group.

* * * * *